June 21, 1960     J. TOGGENBURGER     2,941,645
VARIED-FEED ESCAPEMENT AND ADJUNCT MECHANISMS
Filed Sept. 30, 1958     7 Sheets-Sheet 1

INVENTOR
JOHN TOGGENBURGER
BY
ATTORNEY

June 21, 1960   J. TOGGENBURGER   2,941,645
VARIED-FEED ESCAPEMENT AND ADJUNCT MECHANISMS
Filed Sept. 30, 1958   7 Sheets-Sheet 2
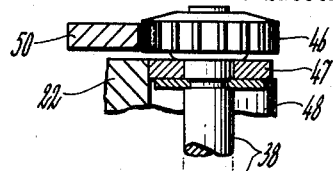
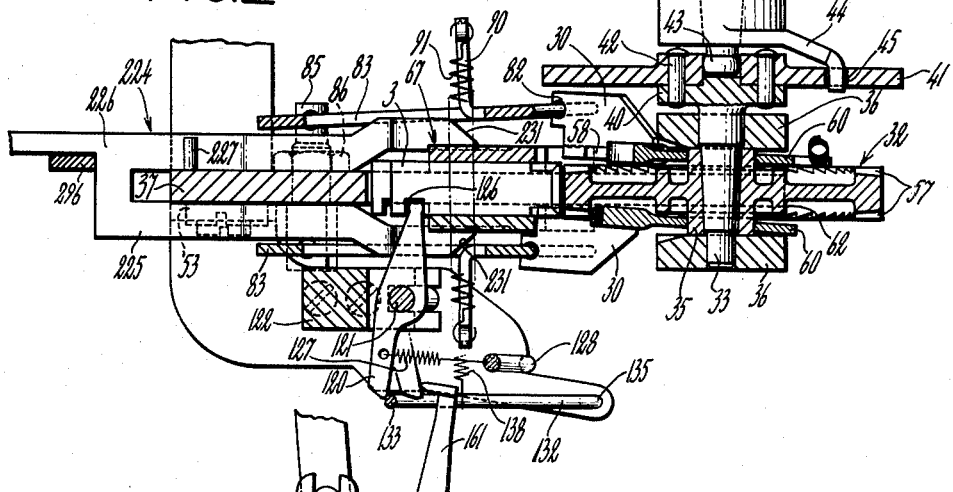
FIG.2
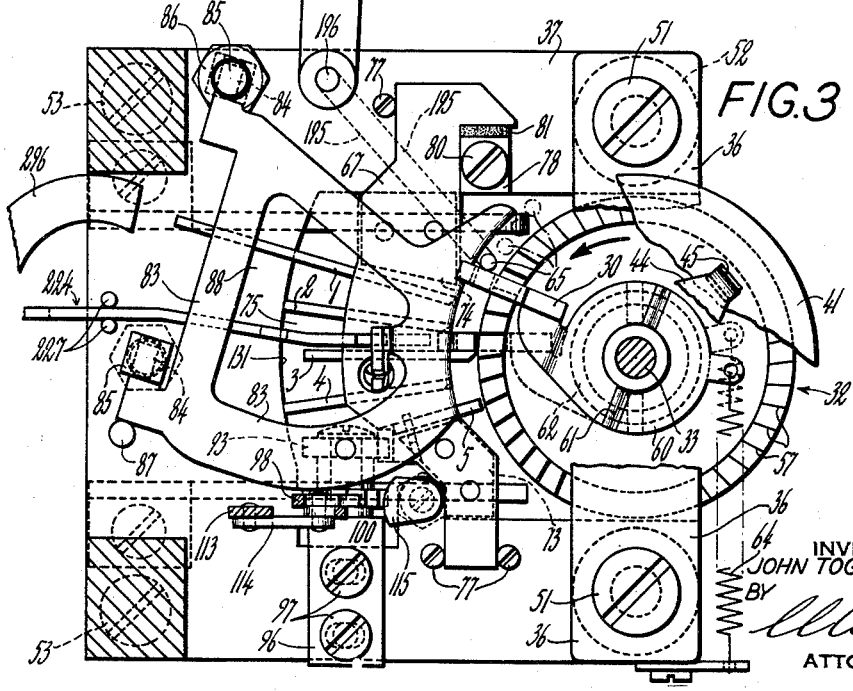
FIG.3
INVENTOR
JOHN TOGGENBURGER
BY
ATTORNEY

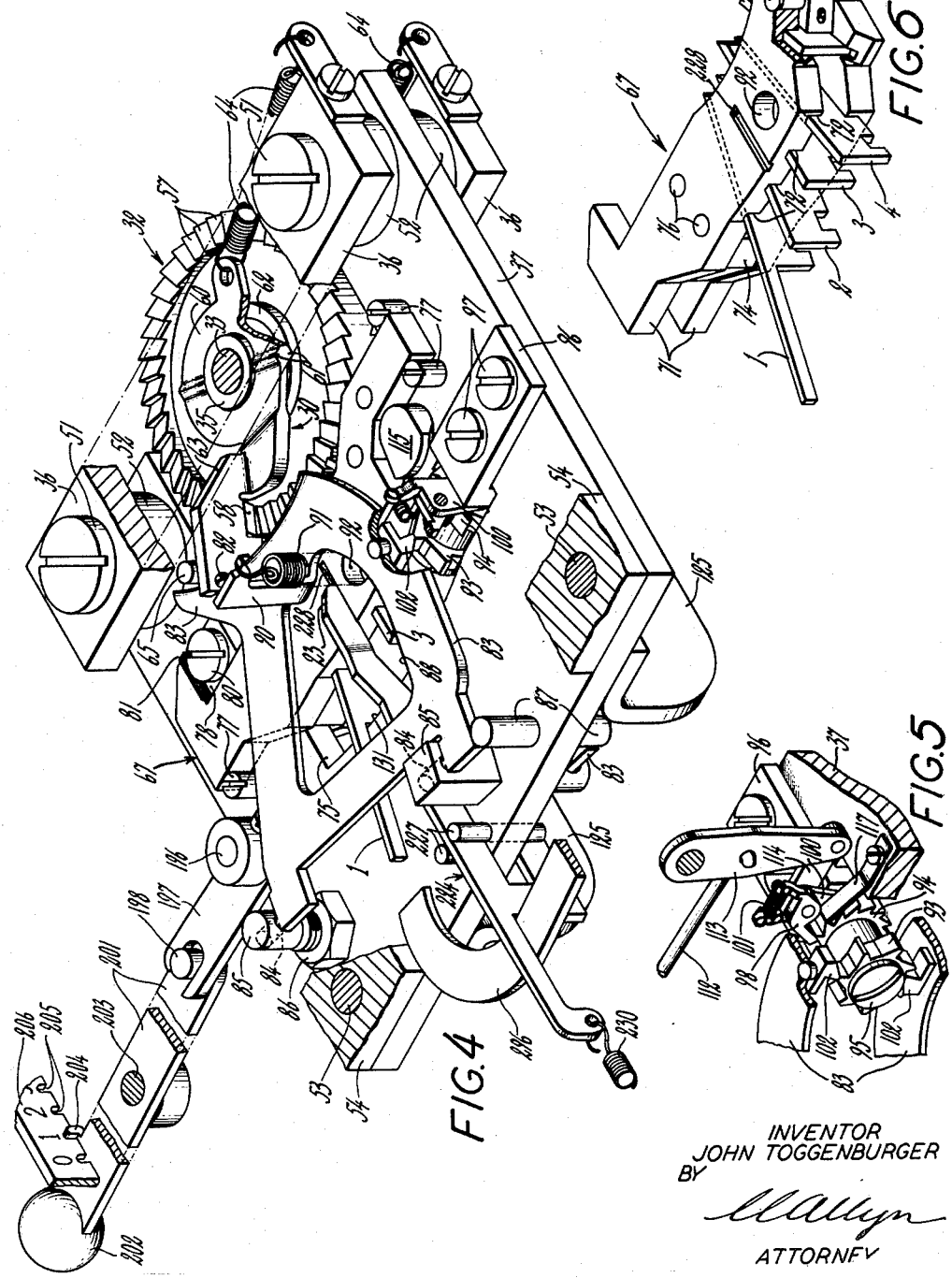
June 21, 1960   J. TOGGENBURGER   2,941,645
VARIED-FEED ESCAPEMENT AND ADJUNCT MECHANISMS
Filed Sept. 30, 1958   7 Sheets-Sheet 3
INVENTOR
JOHN TOGGENBURGER
ATTORNEY

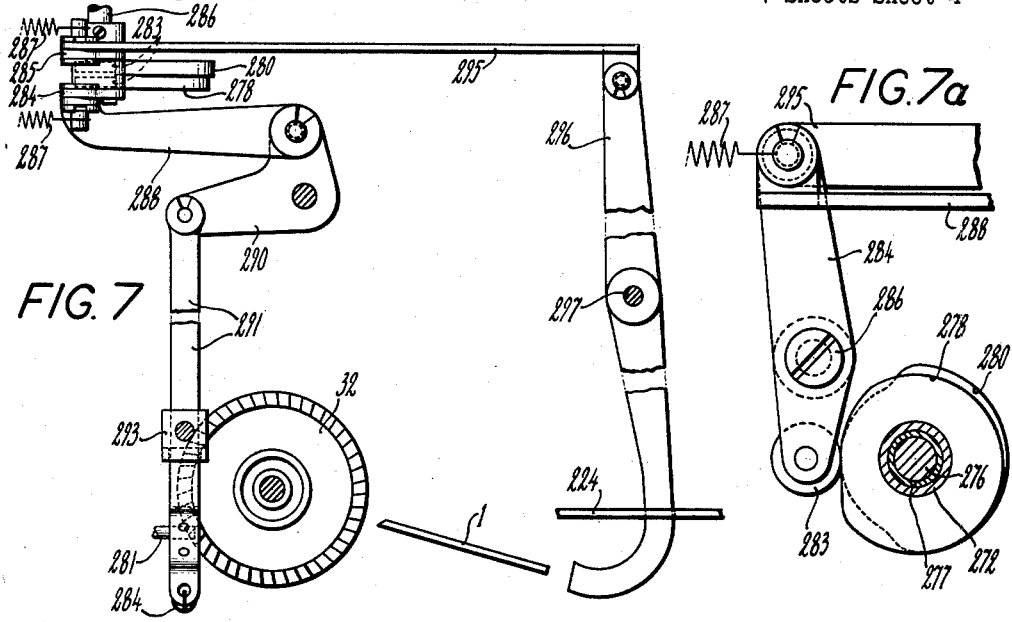
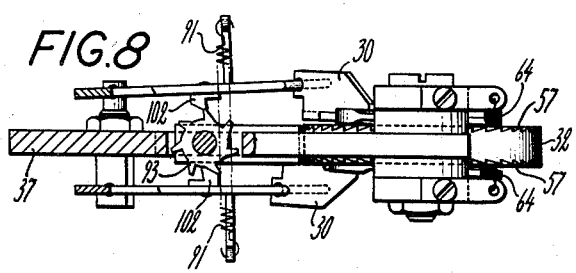
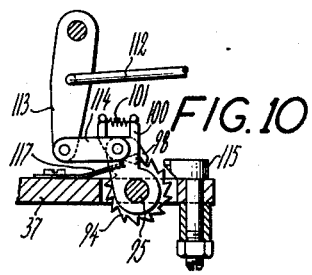
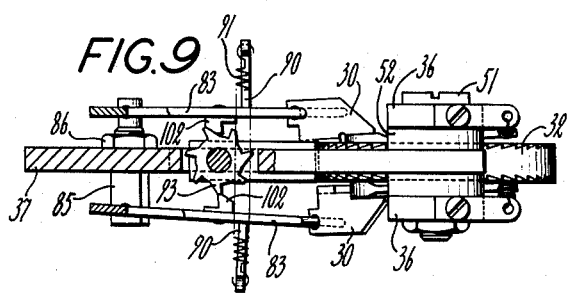
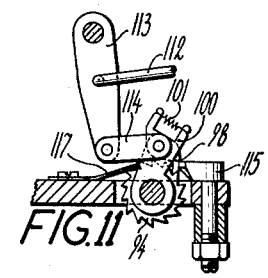

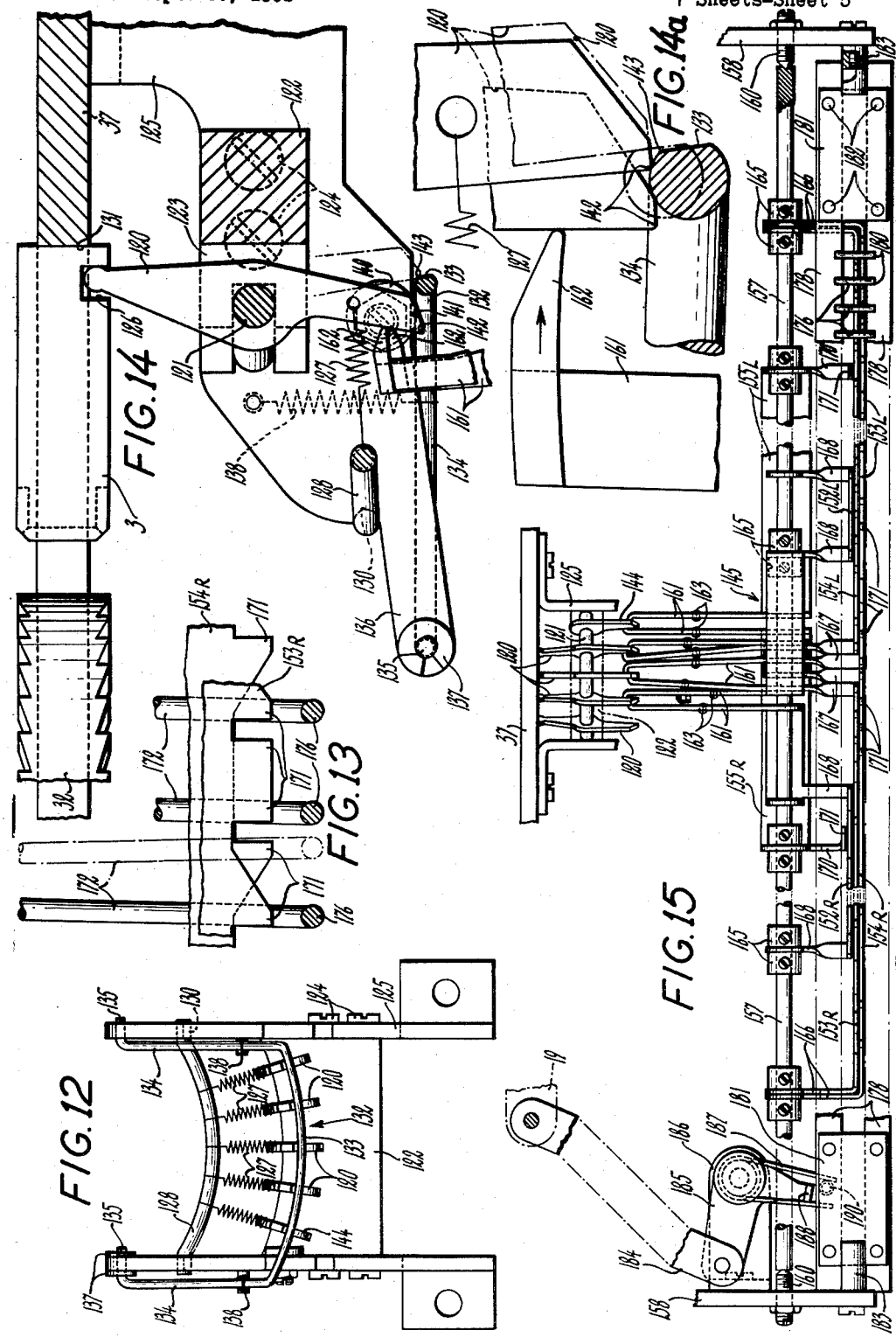

June 21, 1960  J. TOGGENBURGER  2,941,645
VARIED-FEED ESCAPEMENT AND ADJUNCT MECHANISMS
Filed Sept. 30, 1958  7 Sheets-Sheet 7
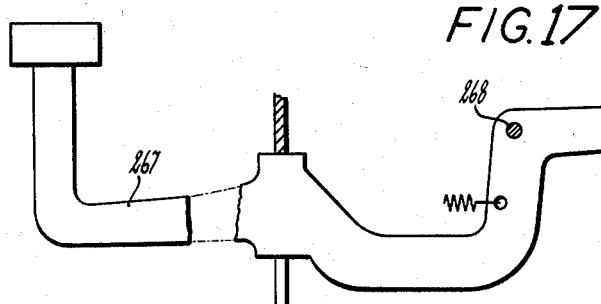
FIG. 17
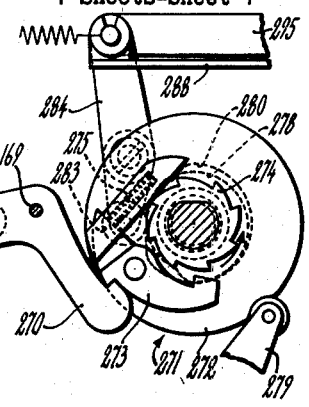
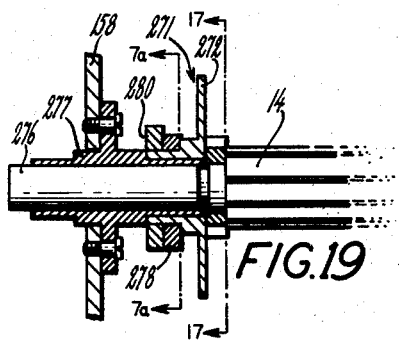
FIG. 18
FIG. 19
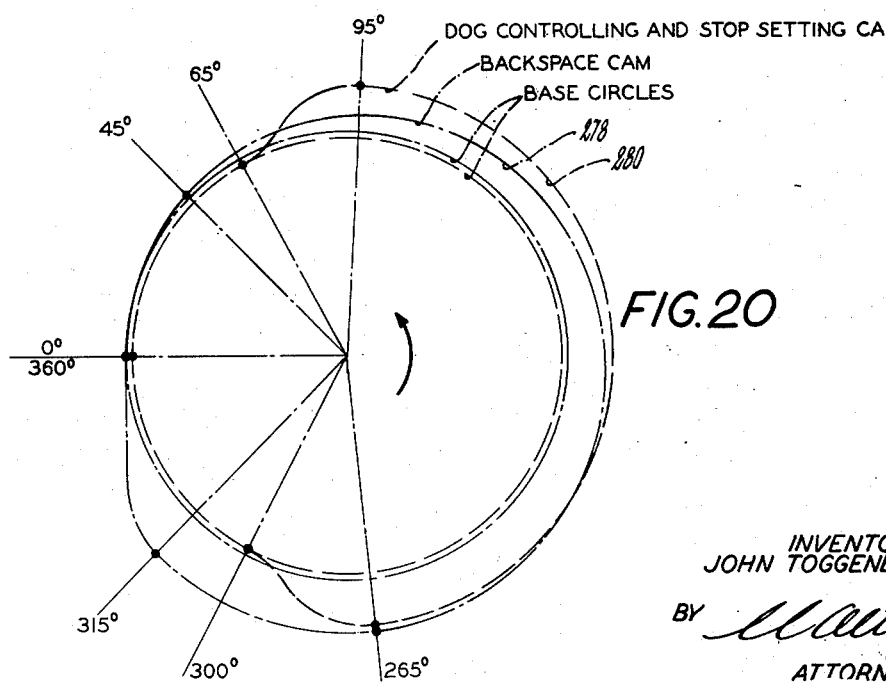
FIG. 20
INVENTOR
JOHN TOGGENBURGER
BY
ATTORNEY

United States Patent Office 2,941,645
Patented June 21, 1960

2,941,645
VARIED-FEED ESCAPEMENT AND ADJUNCT MECHANISMS

John Toggenburger, Hartford, Conn., assignor to Underwood Corporation, New York, N.Y., a corporation of Delaware Filed Sept. 30, 1958, Ser. No. 764,283

37 Claims. (Cl. 197—84)

This invention affords broadly a new and improved escapement mechanism of the kind whereby a member may be controlled to take definitely measured steps of different magnitudes. Broadly it is capable of use in connection with all sorts of machinery or devices wherein an element is required to feed varied, definitely measured steps. The mechanism of the invention has been developed specifically for use in typewriting and related machines wherein character prints or general equivalents are to be rendered seriatim on a record medium, spaced generally proportionally to the width of the characters. However, the mechanism of the invention is not to be considered restricted to the specific use for which it has been developed.

The invention constitutes an improvement over an application Serial No. 462,670, filed October 18, 1954 by the instant inventor, now Patent No. 2,862,595. In said application, measured steps are payed out to a typewriting machine carriage by two dog means which are alternated as to engagement each time the machine renders a character on a record medium. Thus always one or the other of said dog means is in control over the carriage. Furthermore, while one dog means measures out the appropriate space to the carriage, the other dog means returns to a position ready to be engaged for measuring out the next space. The spaces measured out are various multiples of a definite feed increment. In the mechanism of said application, each of the two dog means has its own differentially adjustable stop means, and each stop means embodies a plurality of dogs of graded lengths for alternate engagement directly with a carriage rack, the latter having a pitch agreeing with a given multiple of said increment.

It is a general object of the invention to provide a high speed, ruggedly constructable, simple and reliably effective varied-feed mechanism.

It is a further object of the invention to provide an improved and simplified varied-feed mechanism of the alternately effective dog means principle disclosed in said prior application.

Moreover, it is an object of the invention to provide a varied-feed mechanism incorporating said principle, organized and devised efficiently, so that a single differentially adjustable stop means will govern alternately the space measuring action of the dog means.

It is also an object of the invention to provide an efficient and reliable escapement of the general kind stated, wherein each of the alternately active dog means consists of a single dog.

It is another object of the invention to embody a spacing device of the stated kind efficiently in a key-controllable character-rendering machine, such as a typewriting machine, that is to provide for efficient differential spacing control automatically by the individual character-rendering operations.

Furthermore, it is an object of the invention to provide a space determining stop mechanism which is simple in construction and efficiently settable against very light operating resistance and thus places a minimum of operating load on the character-rendering mechanism.

The nature of the instant escapement mechanism is such that means of conventional design used in typewriters or like machines for releasing the carriage, tabulating or back spacing it, are not compatible therewith without incorporation of significant changes adapting it thereto.

Therefore, it is also an object to devise severally such stated means in efficiently controlling association with the novel escapement mechanism.

Many other features and objects will be in part obvious and in part pointed out particularly as the following description of a preferred embodiment of the invention proceeds.

Now referring to the drawings,

Figure 2 is a left-hand sectional side view taken through the center of the escapement.

Figure 3 is a plan view of the escapement seen in Figure 2.

Figure 4 is a right-hand rear perspective view of the escapement.

Figure 5 is a fragmentary perspective view showing an escapement dog alternating mechanism, the view being taken from the rear of the machine in a rightward direction.

Figure 6 is a perspective view of an escapement stop mechanism carved out of Figure 4.

Figure 7 is a plan view of a back spacing pawl mechanism devised for use with the escapement of the invention, the front of the machine being toward the left.

Figure 7a is a fragmentary right-hand side view of a cam and follower mechanism being part of the back spacing mechanism.

Figure 8 is a fragmentary left-hand view of the escapement mechanism showing the stated dog alternating mechanism positioned so that the lower escapement dog is in control.

Figure 9 is similar to Figure 8 but the dog alternating mechanism is positioned so that the upper escapement dog is in control.

Figure 10 is a fragmentary left-hand side view of a portion of a ratchet feed device being part of the dog alternating mechanism seen in Figure 5, the parts being in a normal position.

Figure 11 is similar to Figure 10 but shows said ratchet feed device operated.

Figure 12 is a bottom view of a portion of an escapement stop setting mechanism.

Figure 13 is a fragmentary plan view of certain space selecting members and related operating links.

Figure 14 is a right-hand sectional view of the escapement stop setting mechanism.

Figure 14a illustrates in enlarged aspect a portion of the mechanism seen in Figure 14 in action so that the setting of one escapement stop will cause the restoration of one that has been previously set.

Figure 15 is a rear view of an escapement stop controlling bail mechanism.

Figure 17 is a right-hand side elevation showing a back space key along with a cyclic power mechanism for operating the back spacing mechanism of Figure 7.

Figure 18 is a front elevation of a portion of a back space pawl and its normal relation to an escapement wheel.

Figure 19 is a front sectional view through the center of a back spacing cam unit, and finally, Figure 20 illustrates schematically the forms of two cams embodied in the cam unit of Figure 19.

Old typewriter mechanism

Figure 1:
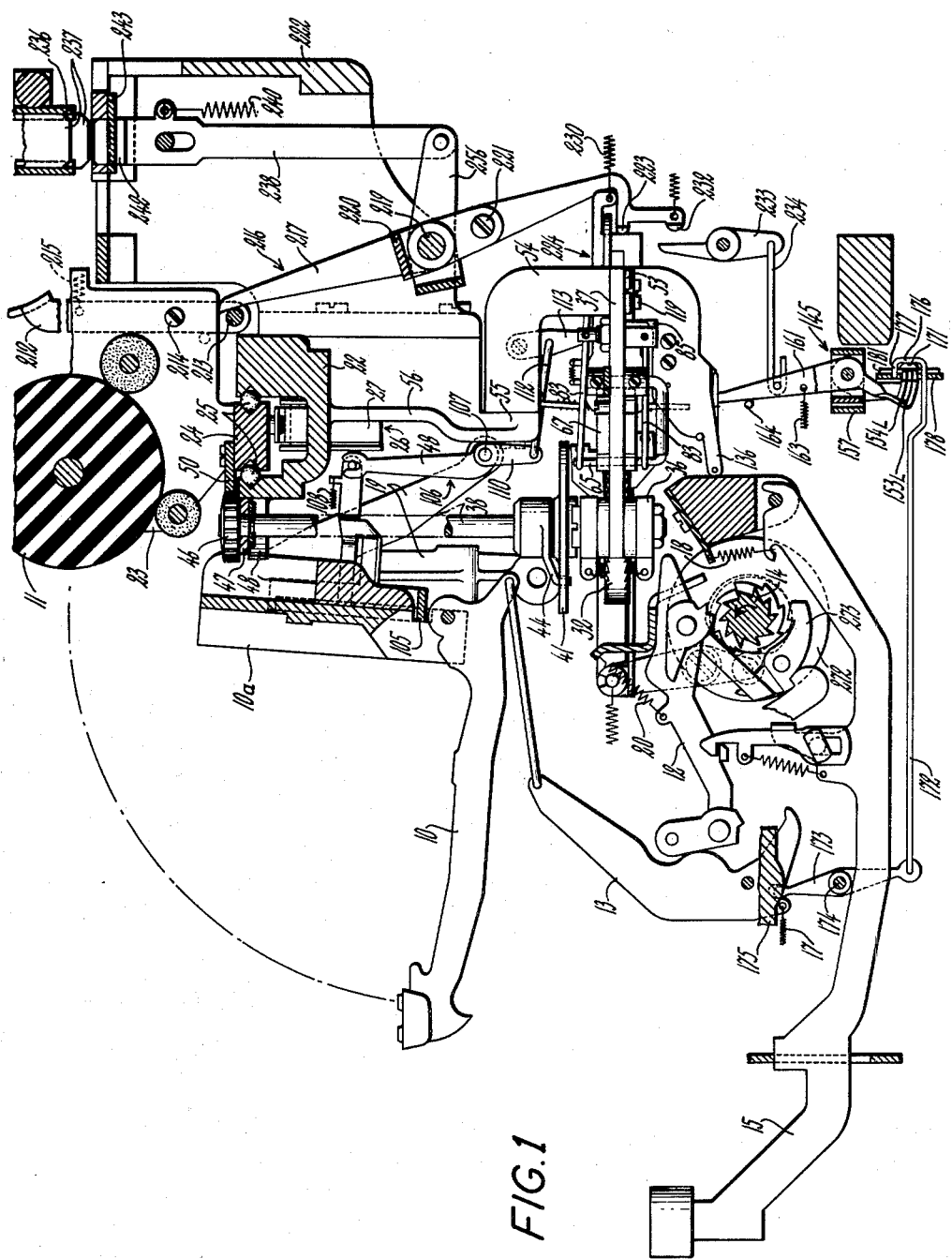
Figure 1 is a right-hand sectional side elevation of an all-electric Underwood typewriter wherein the escapement mechanism of the invention and related mechanisms have been incorporated.

Referring now more particularly to Figure 1, the invention is applied to an all-electric Underwood typewriter which embodies a power typing mechanism of the kind shown in the patent to Yaeger No. 2,254,764, dated September 2, 1941. Said typing mechanism includes many type bars 10 pivotally carried in a usual segment 10a, and individually swingable against a platen 11 to type at a common typing point. Each type bar 10 is power operable by an actuator 12 through a train of mechanism comprising a generally upright sub-lever 13, there being a transverse row of actuators 12 and a transverse row of sub-levers 13. All of said actuators 12 are normally spring-held clear above a toothed power roll 14 and are adapted to be lowered into toothed, motion-receiving relation with said roll, the said roll 14 rotating constantly in the direction of the arrow when the machine is in use. Key levers 15, one for every actuator 12, are individually operable to connect the actuators 12 selectively with the power roll 14 for single transitory operations, thereby to effect selective operations of the type bars 10 against said platen 11. Springs 17, 18 and 20 bias the parts of the described type actions toward their normal positions shown in Figure 1. The segment 10a is supported on a case-shiftable frame indicated at 19 and is downwardly case-shiftable therewith in a usual manner from the lower case position seen in Figure 1 to an upper case position. The stated typing mechanism, exclusive of the type bars, is supported in a frame structure which comprises a trackway 22 whereon a carriage 23 is guided for travel, the said carriage having turnably supported thereon the said platen 11. For carriage guiding cooperation in the trackway 22, the carriage includes a channel bar 24, there being usual antifriction elements 25 provided between the trackway 22 and said channel bar.

The carriage 23 is constantly urged in letter-feed direction, that is leftwardly, by a spring motor which is indicated at 26 and has a drawband connection 27 with the carriage. However, movement of the carriage is subject to the control of a novel varied-feed mechanism which will presently be described.

Varied-feed escapement

The varied-feed mechanism is of a design adapted to feed the carriage in varying multiples of definite, fine increments. For example, when the letter "i" is typed the carriage executes a two-increments movement and when the letter "W" is typed, the carriage executes a five-increments movement.

The varied-feed mechanism is in the nature of an escapement and comprises two escapement dogs 30 which alternately are in control of an escapement wheel 32, one dog being in control of the escapement wheel resultant to one typing operation and the other resultant to the next and there being one alternation for every typing operation. The latter is mounted fast on a short shaft 33, see Figure 2, the shaft having a tapered portion by which it has a firm hold in a hub 35 of the wheel 32 which extends axially from the wheel oppositely to equal extents. The shaft 33 is turnably carried in two bars 36 of rectangular cross section wherebetween the wheel hub 35 fits turnably. Said bars 36 are part of a stationary, frame-supported escapement mechanism frame which includes also a horizontal flat plate 37.

Joined with the shaft 33 substantially coaxially therewith, is a shaft 38 forming in effect an upward continuation of the shaft 33. The escapement wheel shaft 33 has an upper flanged end 40 which is shown to have attached thereto by rivets 42 a disc 41. A central bore 43 in the wheel affords a socket for the lower end of the shaft 38. The shafts 33 and 38 are caused to turn unitarily by the provision of an arm 44 which by a hub is driven fast onto a taper of the shaft 38 and which has a vertical ear reaching into a perforation 45 of the disc 41. The fit in said perforation is such that there is no play circularly of the disc 41. The upper end of the shaft 38 carries fast thereon a gear pinion 46 and just below such pinion the shaft 38 is turnable in a plate 47 which by screws, not shown, is fastened upon forwardly extending bosses 48 of the trackway 22 which flank said shaft 38 with considerable clearance. The pinion 46 is in constant mesh with a rack 50 which is carried fast on the channel bar 24 of the carriage.

Referring to Figures 3 and 4 it will be seen that the bars 36 and the main plate 37 of the escapement supporting frame are secured together by screws 51, one bar being above and one below the said plate 37, both spaced therefrom equally by spacing collars 52. The shanks of the screws 51 fit holes in the upper and lower bars 36 and said plate and the structure is firmly drawn together by nuts on the lower ends of the screws. Horns 54 which are secured at 55 to flanges 56 of the trackway 22 are downreaching therefrom and the escapement frame is secured by its plate 37 upwardly thereto by means of screws 53.

The escapement wheel 32 has axially oppositely facing rings of teeth 57 which are of ordinary sawtooth form and each of the escapement dogs 30 has a tooth 58 adapted to engage the teeth of one such ring. The dogs 30 have each a washer-like portion 60 whereby they are carried for pivotal movement at the opposite sides of the escapement wheel 32 on the hub 35 thereof. Furthermore, ridges 61 on opposite faces of the washer-like dog portions extend transversely of the escapement wheel axis, at right angles to the plane at which the related dog tooth 58 lies. The ridges 61 on each dog constitute swellings accommodated freely but snugly between the inner face of the adjacent bar 36 and a parallel face on the wheel afforded by a circular rib 62. Each dog 30 is thus swingable about the swelling for its tooth 58 to engage with its associated ring of teeth 57. Furthermore, the fit of the washer portions of said dogs around the wheel hub 35, and the fit of said swellings, is such as to facilitate free pivotal movement of the dogs concentrically of the shaft 33. The dogs are preferably formed of sheet steel, bent and/or pounded into the shape shown. See particularly Figure 4. A portion 63 of each dog is at right angles to the washer-like portions 60 to afford the tooth 58. Considered in reference to Figures 3 and 4, springs 64 individual to the dogs 30 urge them constantly clockwise, which is counter to the letter-feed turning direction of the escapement wheel indicated by an arrow, see Figure 3. Thus each dog 30 when moved clear of its related ring 57 of escapement wheel teeth will immediately spring against a stop 65.

When either dog 30 is brought into engagement with its related ring 57 of escapement wheel teeth, the other dog will be moved clear of its own related ring of teeth. Consequently the escapement wheel 32, under the urge of the carriage spring motor 26, will advance in the letter-feed direction indicated by the arrow until the engaged dog becomes intercepted by one of five selectable stops which are numbered 1 to 5, the numbering of such stops being indicative of the carriage advance which each controls in terms of an increment of given magnitude.

The stops 1 to 5 are all supported in a unit 67 which is best illustrated in Figure 6. They are preferably in the form of blades disposed in planes radiating from the escapement wheel axis at angles differentiating in accord with the spacing of the teeth of the escapement wheel 32. The width of the stops or blades 1 to 5 is about equal to the width of the escapement wheel 32 at its periphery. Said blades are individually projectable toward the wheel 32 periphery from idle positions in which they are completely clear of both dogs. Any blade 1 to 5, when projected, is capable to intercept either of the dogs 30 which may be brought into engagement with its related ring 57 of escapement wheel teeth. The projected stop intercepts each dog 30 by a portion which is immediately radially beyond the tooth 58 of the dog. In Figures 2 and 3 the stop 3 stands selected and the lower dog 32 is engaged with its ring of teeth and stands intercepted by the selected stop. It will be perceived that either dog 30 when being intercepted has its arresting portion, its tooth 58 and its swelling 61 centered in a single line radiating from the wheel shaft 33, whereby substantially no tendency arises from the dogs to twist incidental to their carriage halting action. The blade 5 is permanently in the path of both dogs 32 and it comes into use only if in an escapement operation none of the stops 1 to 4 are selected.

The stop unit 67 embodies two plates 71 of identical outline having guide slots 72 for the stops 1 to 5 facing towards each other, the slots being severally in planes radiating from the escapement wheel axis. The two plates 71 are joined by rivets 76, in overlying relation, with spacers 73 and 74 introduced therebetween. The stop blade 5 is held immovably in position by a pin driven into the spacer 73. Of course, the blades 1 to 4 are accommodated freely projectable in their slots 72.

The plate 37 of the escapement unit has a bight 75 wherein the escapement wheel 32 is accommodated and which is bridged by said stop unit 67. The spacers 73, 74 of the stop unit are slightly thicker than the plate 37 and are accommodated within the bight 76 and with slight capacity of the unit 67 for movement tangential to the escapement wheel 32. Beyond said spacers 73, 74, the plates 71 straddle the plate 37. Pins 77 driven into the plate 37, in conjunction with a square block 78 fastened by a screw 80 to the plate 37, guide the said unit 67 tangentially to the escapement wheel. A pad of resilient material 81, such as nylon, is provided on said square block 78 to afford a cushion against which the stop unit reacts each time a blade thereon intercepts one of the escapement dogs 30 and thus the carriage. The shock of interception of the carriage is thus minimized and in turn the strain on the dogs 30 and other elements involved is correspondingly reduced. It is to be understood that the stop unit 67 may be fabricated of one piece and may be formed of sintered metal, nylon or any suitable material. The capacity for tangential displacement of the unit 67 is only sufficient to facilitate appropriate cushioning action.

The stops 2 to 4 are selectively projectable automatically by the operations of the type actions in accord with required letter space sizes for the particular imprints that are being made. The stop selections are made toward the conclusion of each typing operation. Concomitantly each time one of the two dogs 30 is moved free of its ring 57 of escapement wheel teeth the other dog is engaged with its ring of teeth, wherefore an escapement step will take place of a magnitude determined by the stated stop selection. The mechanism whereby the aforestated alternations of the dogs is effected will presently be described.

Each of the dogs 30 has at its outer end a notch 82 whereinto there extends a rocker blade 83 of sheet material, each said blade having an edge facing toward the axis of the escapement wheel 32 and substantially concentric therewith. Each rocker has two spaced pintles 84 reaching into fulcrum holes which are provided in alignment on two studs 85. The latter are carried at spaced locations fast on the escapement unit plate 37 and have each a square head on one side of the plate 37, a reduced shank of each stud reaching through said plate to project therefrom, each of the studs 85 having one fulcrum hole in its head and another in the shank. Nuts 86 on threaded portions of the studs secure the latter. The said studs extend oppositely through the plate. Each of the rockers 83 is axially located by one of the square heads and a pin 87 which is removably driven into the plate 37 and common to both the rockers. Said rockers are identical stampings and have each a cutout 88 for weight reduction. Moreover, each includes a spring anchorage finger 90 bent therefrom, such fingers being bent to extend in opposite directions as shown and a contractile spring 91 being stretched therebetween to urge the rockers toward each other. Said spring 91 extends through a clearance hole 92 through the stop unit 67.

Alternate engagement of the dogs 30 with the escapement wheel 32 is effected by employ of a small toothed wheel 93 having an uneven number of teeth, see particularly Figures 3 and 5. Such toothed wheel 93 has coaxial and unitary therewith a ratchet wheel 94 having double the number of its teeth. The wheels 93, 94 are turnably accommodated on a headed stud 95 which projects from an angle shaped bracket 96 which by screws 97 is adjustably secured to the plate 37. A feed pawl 98 for the ratchet wheel 94 is pivotally mounted upon an arm 100 which is pivotally borne on the stud 95 between the ratchet wheel 94 and the bracket 96. A spring 101 biases the pawl 98 into engagement.

Said pawl 98 is reciprocated incidental to each type action operation, thereby to feed the ratchet wheel a single tooth. It will be perceived from Figures 8 and 9 that in each successive tooth advance of the ratchet wheel 94 one tooth of the wheel 93 rides free of a cam tooth 102 on one rocker 83, causing such rocker to be spring drawn toward the escapement wheel, and another tooth of said wheel 93 acts cammingly on a cam tooth 102 provided on the opposite rocker for displacing it in a direction from the escapement wheel. In the next feeding step the wheel 93 affects the rocker blades reversely. In this manner the rocker blades alternate the dogs 30 as to engagement with the escapement wheel. At the end of each ratchet feed imparted to the wheel 94 either one or the other of the cam teeth 102 stands poised on top of one of the teeth of the wheel 93, while the other cam tooth 102 stands in a notch of the wheel 93, ready to receive a rocker displacement in a next ratchet feed. Always the engagement of a disengaged dog with the escapement wheel occurs before the dog standing engaged is being disengaged, wherefore the carriage is always under control of at least one of the dogs. This insures reliable escapement wheel control over the carriage at all times.

One single ratchet feed movement is imparted to the wheel 94 incident to each typing operation. Specifically each type bar 10, in a last-part operation toward the platen, operates a curved universal bar 105, displacing it rearwardly to operate a bail 106. This bail has pivotal support, as at 107, on the case shift body 19. A spring 108 urges the universal bar 105 forwardly to the normal position seen in Figure 1. The bail 106 includes a downreaching arm 110 which by a wire link 112 is connected to an arm 113 which is swingably pendant from one of the two escapement unit horns 54. At its lower end the arm 113 has a link connection 114 with the pawl supporting arm 100, see Figures 1, 5, 10, 11. When the universal bar 105 stands unoperated as in Figure 1, the ratchet pawl 98 has the positions seen in Figure 10. Operation of the universal bar 105 occurs as the type bar in its operation nears the platen and during such time the pawl 98 becomes displaced to the position seen in Figure 11. Overthrow of the pawl is prevented by an adjustable stop 115 which is in the form of a bolt having a head of eccentric outline as shown in Figures 3, 4, 10 and 11. The possible limit of movement of the pawl 98 is varied by turning and securing the bolt in differently turned positions. There is associated with the wheel 94 a reverse rotation check in the form of a very light spring element 117. Therefore, when the universal bar and thus the pawl 98 restore, the wheel unit 93 and 94 remains stationary.

Referring now to Figures 12 and 14, each of the stop blades 1 to 4 has in its plane, reaching into a notch 126 thereof, a setting lever 120. Said levers 120 have support on a common pivot wire 121 which curves concentrically about the escapement wheel axis. Such pivot wire is imbedded in a block 122 having slots 123 severally in the planes corresponding to the stop blades 1 to 4. Said block may be die cast or molded and is supported by screws 124 between two spaced, vertical brackets 125. These brackets 125 are secured to the underside of the escapement plate 37 by screws 119. The levers 120 are all identical and each is urged clockwise of Figure 14 by a spring 127, all such springs having anchorage on a rod 128 which is curved concentrically of the escapement wheel axis and has ends seated in saddles 130 on the brackets 125. In their normal positions the blades 1 to 4 rest against an edge 131 which the bight 75 affords concentrically of the escapement wheel axis. The blades 1 to 4 resting against said edge 131 determine for the levers 120 their unoperated positions.

Selective operation of the stop blades 1 to 4 is effected variously by operation of said levers 120 under type action control, as will later herein be set forth. Said levers 120 have associated therewith a provision whereby any one lever 120 which is being operated will cause the restoration of any lever which has precedingly been operated. This provision comprises a lightweight bail 132 which may be formed of steel wire. It has a lever-cooperative portion 133 which is bowed concentrically of the escapement wheel axis and has at each end an arm 134 continuing into a pintle 135, such pintles reaching in identical directions into fulcrum holes provided in fingers 136 of the bracket 125. The bail can be conveniently slipped into position and spring washers 137 on one of the pintles 135 retain the bail axially in position. Springs 138 urge the bail upwardly to the normal position seen in Figure 14, which position is regulatable by an eccentrically adjustable element 140. The lower ends of the levers 120 have each a cam face 141. As any of the levers 120 is operated, its cam face 141 will act on the portion 133 of the bail to cam it transitorily downwardly. As each lever becomes fully operated, a corner 142 thereon passes slightly beyond an edge 143 formed by a flat outer face, as shown in Figures 14 and 14a. Consequently the bail 132, 133 will swing under spring tension upwardly for its portion 133 to block the operated lever against restoration. The edge 143 of the bail is slightly further away from the pivot wire 121 of the levers 120 than a rounded portion which faces toward it. In each operation of any lever 120, as the bail portion 133 is being displaced, see Figure 14a, the corner 142 of the previously operated lever 120 will escape the edge 143, such lever being drawn towards its unoperated position by its spring 127. Here it should be realized that once the corner 142 of the lever 120 escapes the edge 143 the power of the spring 127 is sufficient to restore any lever past the stated rounded portion, it simply being camming thereover.

As has been stated, the stop blade 5 is fixed in potentially effective position. However, it comes into action only incident to typing operations wherein none of the blades 1 to 5 is selected. Whenever in a typing operation the stop blade 5 is to become controlling, the last previously selected blade 1 to 4 must restore. Accordingly there is provided an arm 144 which has a cam edge 141 and a corner 142 the same as any of the levers 120 but is devoid of communication with any stop blade. The arm 144 has a restoring spring 127 the same as any of the levers 120. When operation of a type action calls for a five-units space said arm 144 is operated and will displace the bail 133 as any of the levers 120 does and thereby will cause restoration of any lever 120 which may hold one of said blades 1 to 4 selected.

The selective operations of the stop blades 1 to 4 are effected by the type actions through the medium of a bail mechanism generally designated 145, see Figures 1 and 15. Specifically that lever 120 which is associated with the stop blade 3 has two bails 153L and 153R, the letters L and R standing respectively for "left" and "right." The lever 120 which is associated with the stop blade 2 has similarly two bails 152L and 152R related thereto. The lever 120 which is associated with the stop blade 4 has related bails 154L and 154R. Moreover, the arm 144 which needs to be operated in order to render the stop blade 5 effective, is operable by bails 155L and 155R. The various stated bails are pivotally carried on a common fulcrum rod 157 which extends between the sidewalls 158 of the machine and is removably held by center screws 160. The bails include severally each an upreaching arm 161, each such arm being communicative through a nose 162 thereon with its appropriate stop lever 120 or the arm 144. Springs 163 severally urge the bails counterclockwise of Figure 1 to bear against a stop means indicated at 164. The bails 153L and R and 154L and R include each outer arms 166 and inner arms 167 whereby they are pivotally mounted on the rod 157, the arms 167 being integral with the arms 161. The bails 152L and R have each their own distinct forms and include each a pair of arms 168 which are equivalents to the stated arms 166, 167. The bails 155L and 155R are of still different form and are pivotally associated upon the rod 157 by the arms 161 which reach up to the lever 144 and additionally by arms 170, each of which affords one coding tooth 171. All the stated bails are provided with teeth 171 whereby each is operable by certain type actions only. The bails are nested on the rod 157 as shown in Figure 15 and collars 165 locate them along the rod in appropriate positions.

For variously operating the described bails by certain of the type actions, there is provided for every type action a wire link 172, see Figures 1 and 13. These links are severally operable by the sublevers 13 of the type actions through levers 173 which are pivotally carried on a common pivot rod 174. Semicircular upper ends of the levers 173 fit notches in the sublevers 13. A comb bar 175, by usual transverse slots therein, gives guidance to the sublevers and to the upper ends of the levers 173, maintaining them in operative relations. The fulcrum rod 173 is rigidly supported in the framework of the machine in a manner not shown. At the rear end the wire links 172 have a straight upreaching portion 176 for operative action forwardly against the teeth 171 of the various bails. Each vertical link portion 176 has extending from its upper end a short link portion 177 which is parallel to the link proper. The links are variously guided at their rear ends in notches 180, see particularly Figure 15, provided in two elongate bars 178 which extend transversely of the machine in the same plane and are vertically spaced. Said notches 180 are on edges of the bars facing toward each other, the portion 177 of each link slidingly fitting one notch 180 on the upper bar while the link proper therebelow fits a notch on the other bar. In the forward displacement of any link 172 its portion 176 acts on only such bail which has a tooth 171 in its line of operation, teeth 171 being provided on the appropriate bails at appropriate locations so that for each character typed the appropriate escapement stop blade is operated.

The bars 178 are connected rigidly near each sidewall 158 of the machine by plates 181 spot welded or riveted thereto as at 182. The bar structure so formed is mounted to slide limitedly transversely of the machine. The position of such bar structure shown in Figure 15 prevails if the case shift body 19 stands upwardly moved in its lower case position. The link portions 176 have then teeth 171 opposite to them on appropriate bails to provide appropriate escapement stop selections for lower case typing. Said bar structure becomes rightwardly moved in reference to the illustration of Figure 15 by a case shift of the body 19 downwardly to upper case position. The link portions 176 have then teeth 171 opposite to them on appropriate bails to provide for appropriate escapement stop selections for upper case typing. Studs 183 are secured, by screws, to the sidewalls 158, inwardly extending toward each other. These studs 183 have axially extending vertical slots whereinto the plates 181 reach slidingly. The extreme ends of the bar 178 straddle the unslotted portions of the studs next to the machine walls. Therefore the stated bar structure is guidedly accommodated on the studs 183 for limited movement transversely of the machine. The displacement between the two positions occurs automatically under the control of the case shift body 19 which by a link 184 operates a bell crank 185. Such bell crank has pivotal support on a stationary bracket 186 and is resiliently communicative with the bar structure 180, 181 by means of a spring element 187 which has two legs urged oppositely toward each other against an ear 188 on the bell crank 185. Said spring legs are adapted to act resiliently on the bar structure 178, 181, through a pin 190 thereon. As may be appreciated from Figure 15, the spring legs 187 effect opposite shift of the bar structure while the case shift body 19 travels through a middle range. Moreover as the case shift body nears each shifted position, the bar structure 178, 181 becomes fully moved, it becoming arrested by contact with the opposite sidewalls 158 of the machine. Therefore, in each case shift movement the bar structure 178, 181 assumes its appropriate position, leftwardly or rightwardly moved, before the case shift movement is fully completed. This is amply before, in a following type action operation, a link 172 will act upon the bail mechanism 145 to effect a stop-blade operation. Moreover, it follows ordinarily sufficiently after a preceding typing operation so that the link portions 176 stand clear of the bail teeth 171 and the bails thus remain unaffected by the case shift action. An inexperienced typist however may operate the case shift mechanism confusingly timed with a type key. In such event the bar structure 178, 181 may move as a link portion 176 is operative on a bail tooth 171 either in an operating or a restoring stroke. To allow under such circumstances movement of the link portions 176 without obstruction by the bail teeth 171, such teeth, where required, have leftwardly or rightwardly flanking cam faces 191, see particularly Figure 13. If a type action is required to operate the same stop slide in both positions of the case shift body 19, then the teeth 171 associated therewith may be continuations of each other, see middle of Figure 13. The notches 180 locate the rear ends of the links 172 so that the bar structure 178, 181 will swing such rear ends equally to each side of the points of connection of the links with the levers 173.

As shown in Figure 15, the teeth on the bails 153L and 154R are arranged along a common line because it so happens that the teeth nearest to each other on such bails fall directly in adjacency as shown. Because two bails are provided for operating each of the stop setting levers 120, the selective operation of the escapement controlling stop blades entails the setting in motion of a relatively small mass. This is a highly desirable feature because it minimizes greatly adverse influence on the printing force. The bails, because of their reduced length, can be very lightly constructed and the total weight of each bail can easily be much less than half that of a full-span bail.

*Escapement operation*

Normally either one of the escapement dogs 30 is in control over the carriage 23, depending on whether the dog alternating wheel 93 is in the position of Figure 8 or Figure 9. The dog 30 which happens to be in control abuts, as viewed in Figure 3, counterclockwise against any one of the several stop blades 1 to 5, whereas the free dog stands drawn by its spring 64 against the stop 65. Each type action in its operation draws its associated bail operating link 172 forwardly. The portion 176 of the operated link encounters a tooth 171 on the appropriate bail when the type bar 10 is about 20° from the platen. However, the stop blade operating levers 120 have lost motion in the stop blade notches 126, as shown in Figure 14, so that the operation of such blades begins when the type bars have moved considerably closer to the platen. The curved universal bar 105 is picked up by the type bar heels about the same time the stop blade selection begins and its operation results in a single-tooth feed of the wheel 94, which can be seen in Figures 4 and 5, and thus advances the dog alternating wheel 93 by half of its tooth pitch. Initially in such wheel advancement a tooth of the wheel 93 will pass the high edge of the cam tooth 102 so that the rocker blade 83 supporting it will spring toward the escapement wheel and thereby will draw the unengaged escapement dog 30 which has stood idly against the stop 65, into engagement with its related ring of escapement wheel teeth 57. In the same advance of the dog alternating wheel 93, a tooth thereon acts cammingly on the tooth 102 of the other rocker blade 83, forcing such blade to swing away from the escapement wheel. The escapement dog 30 which to such moment has been actively holding the carriage 23 is thereby forced clear of its related ring 57 of escapement wheel teeth and under influence of its spring 64 will immediately take up a position against the stop 65. The carriage is now drawn in letter-feed direction by its spring motor 26. As the carriage initially advances the newly engaged dog 30 settles into full engagement and then moves unitarily with the escapement wheel 32 until it is intercepted by the selected escapement stop blade 2, 3, 4 or 5. Therefore the carriage is halted after the required incremental movement proportional to the typed character has taken place. This halted position of the carriage will prevail until the dog alternating wheel 93 receives a new feed incidental to the next typing operation. Such new feed of the dog alternating wheel will then first cause the engagement of the dog 30 which has become spring moved against the stop 65, and then will release the dog 30 by which the carriage has been halted just previously. In the typing operation just stated there is made again in appropriate stop blade selection so that again the escapement pays out a required letter-feed step to the carriage.

It will be noted that the carriage is freed to advance in the terminal movement of each type bar toward the platen, and that whichever escapement dog 30 may measure out the required feed step stands accurately located against the stop 65, ready for engagement with the proper escapement wheel tooth.

Each stop blade moves into position while the operated type bar traverses the last 10° toward the platen. At such time the carriage feed resultant from an immediately preceding typing operation is either concluded or virtually concluded so that the new selection of a stop blade will not conflict with the conclusion of the feed movement. Such absence of possible conflict is favored by beveling the stopping ends of the blades on the three sides as shown, and reversely beveling the escapement dogs 30 behind their stop blade engaging portions.

Each stop blade that has stood selected becomes restored only near the very end of the operation of that lever 120 which selects a new stop blade. At such time the newly operated lever 120 has displaced the bail 132 sufficiently for the corner 142 of the previously operated lever 120 to escape the bail edge 143 and allow at least partial return of such latter lever, as shown in Figure 14a. However, so long as the controlling escapement dog 30 exerts pressure against a stop blade the latter will remain operated. Just as soon as the dog 30 which has been active is forced clear of the stop blade, the lever 120 associated with such blade will under urge of its spring 127 complete its restoration and withdraw the stop blade.

The exact timing of the operation of the blade setting levers 120 is adjustable by bending the link operating levers 173 at their lower thin necks. Under some circumstances it may be desirable to time the selections of the stop blades so that they complete their movement an instant after the type bars strike. In such case said bending adjustment of the levers 173 may be made so that operating action on any bail ceases before the stop blade being set reaches fully operated position, the final movement being then afforded by the momentum residing in the operated bail. It is to be understood that the setting of the stop blades requires very little power.

The machine may include several space bars, not shown, each to operate one certain escapement dog stop blade, and at the same time to actuate the operating mechanism for the feed pawl 98 and thereby to alternate the escapement dogs 30. Thereby carriage feeds of appropriate numbers of increments are obtained. The stop blade 1 is provided for operation by such a space bar, but the details for effecting its operation are not illustrated. The escapement has been described in a form embodying an escapement wheel. Obviously, however, many features could be advantageously used in combination with a straight rack.

One important advantage of using a wheel is that different basic pitch requirements can be readily satisfied by the mere use of gears 46 in association with the carriage rack which have different numbers of teeth.

Expanded spacing

The position of the stop 65 whereagainst the escapement dogs 30 move when each is freed from the escapement wheel, is adjustable from the full line position seen in Figure 3 to several other positions indicated in dot-and-dash lines. The said stop 65 if adjusted away from the full line position progressively to said several other positions, will precondition the escapement mechanism to yield spacing expanded by one, two or three increments over the spacing obtainable when said stop is set in the full line position seen in Figure 3. The stop 65 is exterior of the escapement wheeel and is common to the two dogs 30. It is parallel to the escapement wheel shaft 33, and is bent from a rod 195 which has an axis portion 196 extending perpendicularly through the escapement plate 37. Said plate has preferably a boss, not shown, to give pivotal support to the axis portion 196. Having now also reference to Figure 4, it will be seen that an arm 197 is secured to the rod portion 196 and has a slot-and-pin connection 198 with a lever 201 which has a handle 202. Said lever 201 is pivotally supported as at 203 on a stationary part of the machine and includes a detent 204 for engagement variously in detent notches 205 provided in a stationary plate 206, the latter carried fast on the machine framework in a manner not shown. Adjustment of the lever 201 by its handle 202 severally to the indices shown will position said stop 65 selectively in the several indicated space regulating positions. It will thereby determine different initial space measuring positions for either of the dogs 30 whereby an over-all regulation of the size of the proportional spacings is predeterminable.

Escapement release mechanism

Either of the escapement dogs 30 may stand in engagement with the escapement wheel 32 when it becomes desirable to relocate the carriage by hand. The invention provides an escapement dog release mechanism which is effective on either of the dogs 30 which may stand engaged. Furthermore, the invention provides that incidental to each effected escapement dog release a particular one of the space controlling stops, namely stop No. 2, is automatically set and that any other stop setting is cancelled. After the carriage has been properly located by hand, the escapement release mechanism is permitted to restore. This causes the engagement of only one of the escapement dogs, namely the last previously active one. When then the operator lets go of the carriage, it will under the control of the engaged dog and the set stop move always between one and two feeding increments in letter-feed direction.

Having now more particular reference to Figure 1, the stated escapement dog release mechanism comprises at each end of the carriage 23 a release control 212, such controls being part of a bail structure which includes rod 213 extending lengthwise of the carriage. Said bail structure is pivotally carried by studs 214 on the opposite ends of the carriage. A spring 215 constantly tends to restore said bail clockwise to its normal position seen in Figure 1. When said bail is operated counterclockwise of Figure 1, its rod 213 acts on a pivoted structure 216 consisting of a lever 217, an arm 218 and a bridge 200 therebetween. See Figure 16. The stated bridge is an integral part of the arm 218 and is rigidly connected with the lever 217 at 221, see Figure 1. The structure 216 is pivotally borne on a shaft 219 which has support in two spaced walls on a usual tabulating mechanism housing 222. At the lower end, the lever 217 has a lug 223 for operating a dog releasing slide 224. This slide is also seen in Figure 2 and consists of two generally parallel legs 225 which are rigidly joined at 226. Said slide legs 225 straddle the thickness of the escapement unit plate 37. Spaced pins 227 driven into said plate confine the said slide near its rear end for endwise sliding movement, while grooves 228 in the plates 71 of the escapement stop unit guide the free ends of the legs 225. A spring 230 urges the slide 224 to occupy normally the position seen in the various figures. Operation of the slide will release whichever of the two escapement dogs 30 may stand engaged. To this end, each of said legs 225 has a cam face 231 for action on the adjacent dog controlling blade 83 where its spring anchorage finger 90 is bent therefrom. It will thus be seen that operation of the slide 224 will render the escapement wheel 32 free of both the escapement dogs.

Figure 16:
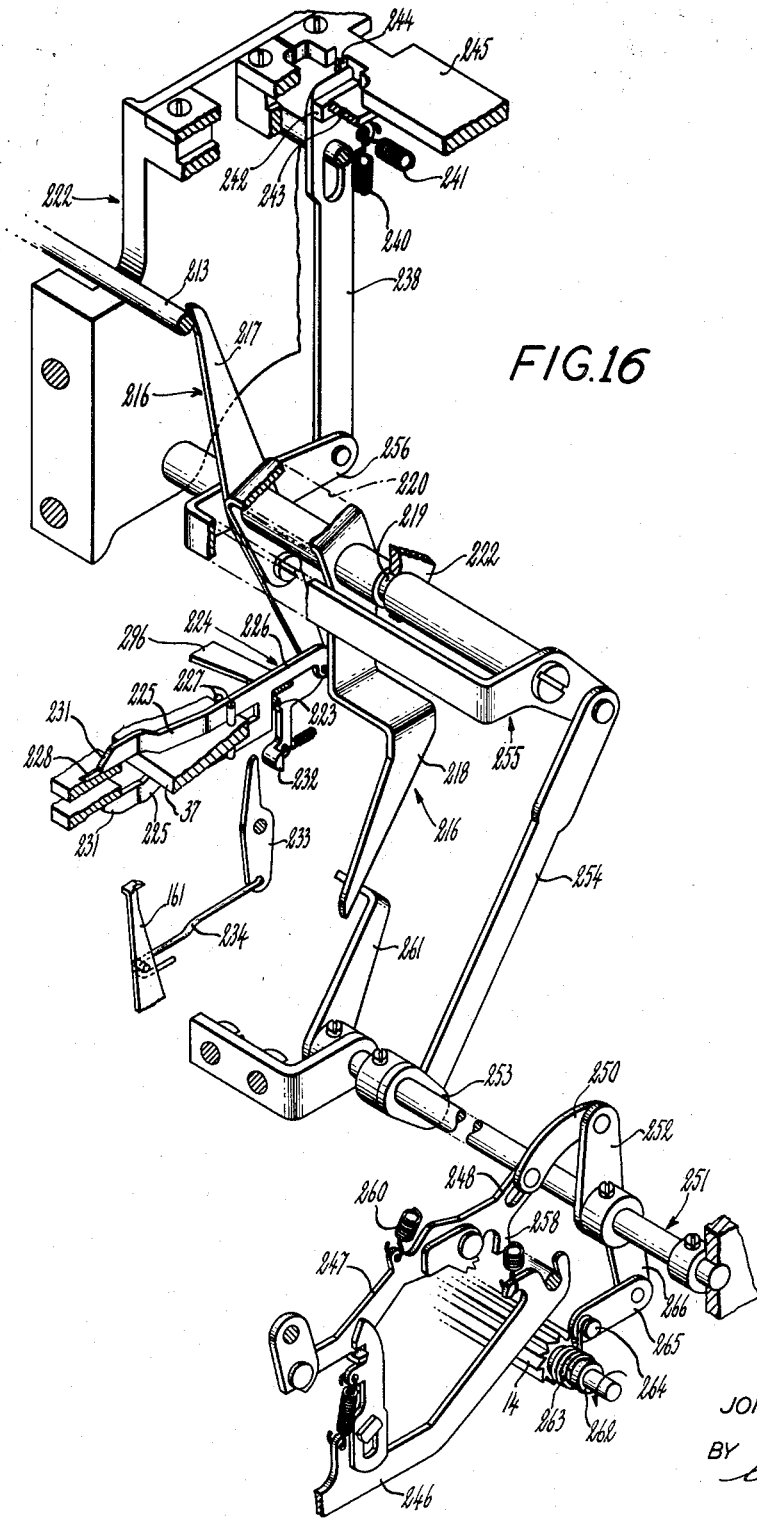
Figure 16 is a right-hand front perspective view showing an escapement releasing and a tabulating mechanism constructed to serve in association with the escapement of the invention.

The lever 217, see Figures 1 and 16, has a further ear 232 by which it will operate a small lever 233 which has pivotal support on the framework of the machine and which by a link 234 is capable of operating the arm of the two-increments space selecting bail 152L. Therefore, each time the escapement dogs 30 are rendered released by the operation of the lever 217, there is automatically set the space controlling stop 2.

After rendering the escapement dogs released as stated and while still holding the control 212 operated, the operator moves the carriage slightly more than 1½ feeding increment rightwardly of the desired position. When then the control 212 is released, the slide 224 will become spring restored and will cause the engagement of one of the escapement dogs 30 with the escapement wheel. When thereupon the operator lets go of the carriage, the escapement will uniformly gain control of the carriage after a spring drawn advancement of the cariage amounting to about 1½ feeding increments.

If desired, the described mechanism whereby the ear 232 will set the space controlling stop 2 may instead be associated with any of the other stops. The stop 2 has been chosen so that the operator may have reference to a carriage scale which has graduations arranged at three-units intervals in agreement with the spacing of tabulator stops which are later herein mentioned. The carriage is always moved approximately 1½ increments to the right of the desired scale position and will be drawn leftwardly the same distance when the escapement control is restored.

Tabulating mechanism

A tabulating mechanism embodied in the machine is in most respects the same as one disclosed in the patent to Helmond No. 2,303,878, issued on December 1, 1942. However some changes and additions have been made whereby either active escapement dog of the invention will be rendered released at the outset of each tabulation and whereby further at each tabulation a particular one of the space controlling stops 1 to 5 becomes selected.

Referring to Figures 1 and 16, the carriage 23 has at its rear on a bar 236 a row of usual key-settable tabulator stops 237, such stops being preferably spaced in accord with triple spacing increments. Below said stops 237 there is a usual tabulator counterstop blade 238 which under the tension of a spring 240 stands normally drawn below any set tabulator stop 237. Said counterstop blade is projectable upwardly in a usual manner into tabulation controlling range of such of the tabulator stops 237 which have been set to define tabulating positions for the carriage. A spring 241, see Figure 16, has a rightwardly tilting urge on the counterstop blade 238. A ledge 242 on the counterstop blade provides that it will be detained upon its projection, said blade becoming rightwardly urged by the spring 241 for the ledge to catch over a stationary shelf 243. The said counterstop blade will then stand detained until after a set tabulator stop 237 through tabulating movement of the carriage effects its leftward displacement for its ledge 242 to clear said shelf 243. This displacement is limited by stop shoulder 244 afforded by an opening in a top plate 245 of the tabulator housing 222.

The projection of the counterstop blade 238 is effected in response to the operation of a tabulator key lever 246 shown in Figure 16. Said key lever calls into action a power mechanism to project said blade. Specifically, the key lever 246, when operated, draws a power actuator 247 into motion receiving relation with the toothed power roll 14, the latter of which serves also the type action actuators 12. Said actuator 247 will consequently be driven forwardly, and by a slotted rear end 248 and through a link 250, will rock a shaft unit 251 through an arm 252 thereof. This shaft unit includes also an arm 253 which by a link 254 operates a bail 255 pivotally carried on the aforestated shaft 219. At the left the said bail includes a rearwardly reaching arm 256 to which the lower end of the counterstop blade 238 is articulated.

The actuator 247 has a nose 258 which while it is being operated moves into engagement with the toothed power roll 14 and which consequently is forced upwardly by such roll. In this manner the disengagement of the actuator 247 is effected and causes its return to normal position by a spring 260. The slotted rear end 248 allows the return of the actuator independently of the shaft unit 251, the return of the latter being held up pending the engagement of a tabulator stop 237 with the counterstop blade 238, as before stated. The shaft unit 251 includes an arm 261 to operate the bail structure 216. Therefore, resultant to institutions of tabulations, identically as in escapement releases effected under the carriage release control 212, the said lug 223 operates the slide 224 to release the engaged escapement dog, that is to render both of the escapement dogs released. Also, the ear 232 operates the lever 233 and by operating the link 234 causes the setting of the increment stop 2, in the same manner as effected by operation of the carriage release control 212. The condition so attained prevails until in the ensuing tabulating travel of the carriage the counterstop reed 238 is displaced leftwardly by the engaging tabulator stop, about one increment to the left of its position seen in Figure 16. The spring 240 will then restore such reed, as well as the parts connected therewith, inclusive of the arm 261. Consequently the bail structure 216 allows the return of the slide 224 which causes that one of the escapement dogs 30 to engage the escapement wheel which is permitted to do so by its associated rocker blade 83. There follows then an advance of the carriage as measured by the escapement dog running up against the set escapement stop 2, such movement being about 1½ increments.

It is conceived to delay the restoring movement of the tabulator reed 238 free of the engaging tabulator stop, sufficiently so that the carriage will come fully to rest, accurately gaged by the stop shoulder 244. The dog releasing slide 224 will thus effect an engagement of an escapement dog only after the carriage has been definitely located 1½ increments leftwardly of the required position. This provides that the 1½ increment carriage advancement thereafter following the retraction of the counterstop blade 238 will always be uniform and will result in the accurate incremental location of the carriage at the conclusion of each tabulation at a scale increment mark.

The restoring movement of the counterstop blade 238 and its connected parts is delayed by a simple mechanism shown in Figure 16. It comprises a rotor 262 which is slowly turning unidirectionally while the machine is in use, and a torsion spring 263 carried on such rotor and having spring turns lightly bearing therearound. Such rotor may consist of a cylindrical portion at the end of the toothed power roll 14. At one end said torsion spring has jointed to it at 264 a link 265 which in turn is jointed to an arm 266 being part of the shaft unit 251. The opposite end of the spring is unattached. The arrangement is such that the rotor will freely turn within the spring coils so long as the link 265 is held stationary by the shaft unit 251 or is moved to turn the spring 263 counter to the direction to which the rotor 262 is driven. Under such conditions the rotor will tend to unwind or loosen the spring. When the counterstop blade, following its leftward, tabulation terminating displacement, becomes free, it is moved initially quickly downwardly under the tension of its associated spring 240. In such initial movement the link 265 will turn the spring end thereat in the direction in which the rotor 262 turns, but much faster. Because the spring 263 has light frictional contact upon the rotor 262, its free end tends to move at no greater speed than the rotor with the result that immediately the spring wraps itself tightly around the rotor. As soon as this happens the link 265 is restrained from moving faster than the rotor allows the spring 263 to rotate with it. Therefore, after a small, initial fast downward movement the counterstop blade 238 will continue and conclude its downward movement at slow, controlled speed. In the time interval consumed before the counterstop reed 238 moves below the tabulator stop 237, the carriage will have time to settle to a definitely gaged position. The restoration of the dog releasing slide 224 occurs during the restoration of the counterstop blade 238 and is timed to cause the escapement wheel to come under control of one of the escapement dogs just before the counterstop blade moves clear of the tabulator stop. In this manner the engaging escapement dog will gain exact tooth control over the escapement wheel. Furthermore, the engaged escapement dog will then allow a supplemental advance of the carriage accurately and uniformly controlled by the set escapement stop 2. As soon as the counterstop blade 238 is fully restored and thus the link 265 becomes arrested, the rotor loosens automatically its grip on the spring 263. Pending a new restoration of the counterstop blade 238, the rotor will then turn idly within the spring.

It is to be understood that other forms of devices enforcing delayed restoration of the counterstop blade may be used.

*Back spacing mechanism*

Reference is now made more particularly to Figures 7, 7a, 8 and 17 to 20, inclusive, showing a back spacing mechanism which in some respects is similar to one disclosed in the patent to Helmond No. 2,294,662, dated September 1, 1942, but is devised to serve appropriately with the new escapement. In Figure 17 there is shown a back spacing key 267 which is pivoted at 268 and normally stands spring restored as shown. The said key through the medium of a dog 270 pivoted at 169, is in control of a cyclic unit 271 embodying a disc 272 having thereon a clutch pawl 273. The cyclic unit 271 stands normally still in the full cycle position seen in Figure 17, a detent 279 resting in a notch of the disc 272. Said dog 270 is shown to have effected the declutching of the pawl 273 from a toothed driver 274, against the urge of an engaging spring 275. The said toothed driver is fast on the toothed power roll 14 and is constantly rotating therewith while the machine is in use. The toothed power roll 14 has a reduced shaft end 276 which turns in a bearing 277 that is secured on the left side wall of the machine. The cyclic unit 271 is accommodated freely turnable on a reduced portion of the bearing 277, directly adjacent to the toothed driver 274. Said cyclic unit 271 includes fast thereon a back spacing cam 278 and a cam 280 for effecting a transitory escapement dog release as well as a setting of a particular one of the incremental escapement stops. Each of the stated cams 278 and 280 has a follower roll 283 individually bearing thereon, see Figure 7. These rollers 283 are carried on levers 284, 285 which have individual pivotal support on a common pivot stud 286. Springs 287 urge the levers into cam-following positions. The lever 284, when operated by its cam 278, operates through a link 288 on a bell crank 290, such bell crank having a back spacing pawl 291 reaching therefrom rightwardly over one of the rings of teeth of the escapement wheel 32. The back spacing pawl has a tooth 292 fast thereon which by an angular cam face thereof contacting a stationary pin 281, is held normally clear of the adjacent teeth of the escapement wheel, see Figure 18. A frame-supported bracket 293 straddles the back spacing pawl 291 without restricting it against wheel engaging movement. A spring 294 tends to engage the back spacing pawl.

Responsive to each momentary operation of the back spacing key 267 the unit 271 comprising the two cams 278, 280 will execute one single cyclic turn, each turn being terminated as the pawl 278 is intercepted and declutched by the dog 270. During its first 265° of rotation the back spacing cam 278 will actuate forcibly the pawl 291. The first 45° of rotation causes a pawl tooth 292 on the pawl to glide angularly into contact with one of the escapement wheel teeth. The actual back spacing movement occurs from 45° to 265° of rotation. A dwell on the cam 278 is controlling from 265° to 315° of rotation and provides that the back spacing pawl will stand still. It is in this phase of the cycle that the escapement again gains control over the carriage as will be brought out in the paragraph below. During the completion of the turn the back space pawl returns quickly under the power of its related springs 287 and 294.

The other cam 280, through the related lever 285, actuates a link 295 for operating a lever 296 which extends halfway across the machine from near the left side wall. The lever 296 has a stationary pivot 297. Said lever 296 serves to operate the escapement dog release slide 224 as well as to project the escapement control stop 1. Both escapement dogs 30 stand then spring drawn against the initial stop 65. The operation of the lever 296 occurs quickly between 65° and 95° of the cyclic movement of its controlling cam 280 and up to 265° a dwell on such cam keeps the lever operated. Between 265° and 300° of the cyclic movement, that is while the back space pawl 291 stands quiescent in its fully operated position, the lever 296 restores and causes the reengagement of whichever escapement dog has previously been active. Such escapement dog is thus in control over the escapement wheel. The back spacing pawl restores while the cyclic unit 271 moves from 315° to 360° of its turn. During such restoration of the back space pawl, the engaged escapement dog advances with the escapement wheel until after about an advance movement of the carriage of ½ increment the escapement stop 1 arrests the dog. The carriage has thus been back spaced one single increment.

It will be observed that during each back spacing action the carriage is first under control of the escapement dog, then imparted a back spacing movement by the back space pawl and then again restored to the control of the escapement dog. In the farthest operated position the back spacing pawl moves obliquely against an overthrow stop 298. The described mechanism assures reliable and accurate back spacing of the carriage in connection with the escapement of the invention. If the back space key 267 is prolongedly operated, there will occur repetitive cyclic turns of the cyclic unit 271 and therefore repeat back spacing operations.

While only one embodiment of the invention has been shown and described, many variations may be resorted to within the scope of the invention, and portions of improvements may be used without others, or may be used in association with mechanisms of generally similar purpose.

What is claimed is:

1. In a typewriting machine, an escapement mechanism for paying out varied movements of measured extents to a carriage which is impositively urged in an advance direction, comprising two parallel rows of oppositely facing teeth, an escapement dog means individually related with each of said rows of teeth, means to urge each of said dog means along its related row of teeth individually to corresponding initial space measuring positions, always one or the other of said two dog means being in engagement with its related row of teeth, selectively operable typing means, means to effect an alternation in the engagement of said dog means with their related rows of teeth each time the typing means is operated, a variable stop means common to both said dog means arranged near said rows of teeth to limit variably the movement away from the initial space measuring position of whichever of the dog means is newly brought into engagement with its related row of teeth, and means to adjust said stop means by the selective operations of said typing means in accord with the spacing required for the individual characters being typed, whereby at each successvie typing operation a measured movement related in size to the character that is being typed is paid out to said carriage.

2. An escapement mechanism for paying out selectable movements of measured extents to a movable element, comprising row-of-teeth means, two escapement dog means alternately engageable with said row-of-teeth means in corresponding initial space measuring positions and each, when engaged in said row-of-teeth means, having movement measuring control over said element, operable means, means to effect an alternation in the engagement of said two dog means with said row-of-teeth means in response to each operation of said operable means, and a variable stop means having a single set of selectable, movement-limiting stop faces wherewith either of said dog means comes into movement limiting range resultant to being engaged with said row-of-teeth means.

3. An escapement mechanism for paying out selectable movements of measured extents to a movable element, comprising a single escapement wheel, two escapement dogs adapted for alternate entraining engagement with said escapement wheel to be moved thereby, an operable means, means to effect an alternation in the engagement of said two dogs with said escapement wheel in response to each operation of said operable means, and a variable stop means common to both said dogs and adapted to have motion-limiting control over whichever of said dogs becomes newly entrained with said escapement wheel, whereby varied movements of measured extent are adapted to be paid out by said escapement mechanism to said movable element.

4. An escapement mechanism for paying out selectable movements of measured extents to a movable element, comprising row-of-teeth means, two escapement dog means alternately engageable with said row-of-teeth means in corresponding initial space measuring positions and each, when engaged in said row-of-teeth means, having movement measuring control over said element, operable means, means to effect an alternation in the engagement of said two dog means with said row-of-teeth means in response to each operation of said operable means, and a variable stop means having a single set of selectable movement-limiting stop faces wherewith either of said dog means comes into movement limiting range resultant to being engaged with said row-of-teeth means, said stop means comprising a plurality of settable stops disposed exteriorly of the escapement wheel and in the general plane thereof.

5. The invention set forth in claim 4, including means to set at least certain of said stops individually from an ineffective to an effective position and in accompaniment therewith to unset any previously set other stop.

6. An escapement mechanism for paying out selectable movements of measured extents to a movable element, comprising an escapement wheel having two axially spaced rings of teeth facing from each other generally in the direction of the axis of said wheel, an escapement dog related to each ring of teeth for individual turning movement concentrically about the escapement wheel axis, each dog having capacity for engagement with and disengagement from its related ring of teeth generally in the direction of the axis of the escapement wheel and having a ring-of-teeth engaging portion and reaching thereat radially beyond the escapement wheel, variable stop means common to both said dogs disposed exteriorly of said wheel generally between planes in which said rings of teeth are situated, and operable means adapted at successive operations thereof each time to effect an alternation of engagement of said dogs with their respectively related rings of teeth, each dog in being respectively moved into and out of engagement with its related ring of teeth being respectively brought into and out of stopping range of said stop means.

7. The invention set forth in claim 6 said operable means comprising members constituting rockets which have pivot axes in planes which extend generally transversely to the wheel axis, the rockers extending from their axes toward the escapement wheel axis and having thereat controlling associations with the related dogs in any of their possible positions about the wheel axis.

8. An escapement mechanism for paying out selectable movements of measured extents to a movable element, comprising two rows of oppositely facing teeth, an escapement dog means individually related with each of said rows of teeth, said dog means engageable with their related rows of teeth by opposite directional movements, a variable stop means common to both said dog means and arranged therebetween near said rows of teeth, a member individual to each dog means to engage and disengage it, and operable means operatively associated with said members and incidental to each operation adapted to effect through control of said members an alternation of engagement of said dog means with said rows of teeth, each dog means in being engaged and disengaged respectively being respectively brought into and out of stopping range of said variable stop means, said members having each an edge in generally concentric relationship to the escapement wheel and controllingly coacting with one of said dogs, and said operable means comprising a toothed wheel arranged between said members and rotated for control of said members a half tooth space at each operation of said operable means to effect alternation in the engagement of said dog means.

9. An escapement mechanism for paying out movements of measured extents to a movable element, comprising two rows of oppositely facing teeth, an escapement dog means individually related with each of said rows of teeth and movable parallel to said rows of teeth, said dog means engageable and disengageable with their related rows of teeth by control movements transversely of said rows of teeth, a variable stop means common to both said dog means and arranged therebetween near said rows of teeth, each said dog means when engaged being movable with the engaged row of teeth and by cooperation with said stop means adapted to pay out a measured movement to said element, a member individual to each dog means to engage and disengage it and for this purpose having a controlling edge extending parallel to said rows of teeth, and operable means operatively associated with said members and incidental to each operation adapted to effect through control of said members an alternation of engagement of said dog means with said rows of teeth, each dog means in being respectively engaged and disengaged being respectively brought into and out of stopping range of said variable stop means.

10. An escapement mechanism for paying out movements of measured extents to a movable element, comprising an escapement wheel having two spaced rings of teeth facing from each other generally in the direction of the axis of said wheel, an escapement dog related to each ring of teeth for individual turning movement with the escapement wheel, each dog having capacity for engagement with and disengagement from its related ring of teeth generally in the direction of the axis of the escapement wheel, and having a ring-of-teeth engaging portion and thereat reaching outwardly beyond the escapement wheel, means operable to control said dogs so that at each of its operations an alternation of engagement of said dogs with their respectively related rings of teeth takes place, and means common to both said dogs to control their magnitudes of space measuring turning movements with said wheel, comprising, exteriorly of said wheel an initial space measuring abutment means which is common to both said dogs, manually settable adjusting means for adjusting such abutment means to different positions, and a variable space limiting stop means which is also common to both said dogs and also exteriorly of said escapement wheel.

11. The invention set forth in claim 6, and a supporting structure for said wheel and said stop means, comprising a plate having a bight in which said wheel is accommodated with its axis extending squarely to the plate, and a means bridging the bight of the plate at each axial end of said wheel beyond the dogs and thereat embodying bearings for the escapement wheel axis.

12. The invention set forth in claim 6, and a supporting structure for said wheel and said stop means, comprising a plate in the general plane of the wheel having a bight in which said wheel is accommodated with its axis extending squarely to the plate, a means bridging the bight of the plate at each axial end of said wheel beyond the dogs and thereat embodying bearings for the escapement wheel axis, and a unit incorporating said stop means and being supported by said plate to afford said stop means in said bight in the general plane of said wheel.

13. An escapement mechanism for paying out movements of measured extents to a movable element, comprising an escapement wheel having two axially spaced rings of teeth facing from each other generally in the direction of the axis of said wheel, an escapement dog related to each one of said rings of teeth and generally extending radially of the escapement wheel axis, an annular groove means provided concentrically of the escapement wheel at each axially opposite end thereof and being appreciably smaller in diameter than said rings of teeth, means associating each dog in one of said groove means with capacity for swinging in a direction axially of the wheel into and out of engagement with its associated ring of teeth and with further capacity for movement pivotally about the axis of the wheel while being either in or out of engagement, said dogs having each a ring-of-teeth engaging portion and reaching thereat radially beyond the escapement wheel, variable stop means for said dog means exterior of said escapement wheel and generally between planes in which said rings of teeth are situated, and operable means adapted at successive operations thereof each time to effect an alternation of engagement of said dogs with their respective related rings of teeth, each dog in being respectively moved into and out of engagement with its related ring of teeth being respectively brought into and out of stopping range of said stop means.

14. The invention set forth in claim 13, said associating means of each dog comprising on the dog a portion pivoting it in the related annular groove means to move concentrically about the wheel axis and each such dog portion having localized thickenings fitting between sides of the related groove means along a line transverse to the general direction in which the dog radiates from the wheel axis and square to the wheel axis.

15. In combination with an escapement wheel which has a ring of teeth axially facing therefrom, an escapement dog for opposite engagement and disengagement axially of the escapement wheel, a radially open groove means provided concentrically of the escapement wheel and being of smaller diameter than said ring of teeth, and means on said dog associating it directly in said groove means with capacity for swinging movement in a direction axially of the wheel into and out of engagement with said ring of teeth and with additional capacity for pivotal movement concentrically to the axis of the wheel.

16. The invention set forth in claim 9, said operable means including a provision to control said members so that in each said alternation, the disengaged dog means is first engaged and then the engaged dog means is disengaged.

17. In a machine for rendering characters on a record medium seriatim in accord with individually assigned space values; a selectively operable character rendering means, a letter-feeding carriage, an escapement mechanism for control of said carriage comprising row-of-teeth means, two escapement dog means to pay out variable space values to said row-of-teeth means and thus to said carriage, means to alternate said dog means as to engagement with said row-of-teeth means in response to each selective operation of said character rendering means, a variably settable stop means associated with said dog means to determine different space values to be paid out by the particular dog means which is newly brought into engagement with the row-of-teeth means, and means to variably set said stop means by selective operations of said character rendering means, escapement releasing means operable to disengage either of said dog means which may stand engaged under the control of said alternating means and when restored causing the engagement of only one of the dog means in said row-of-teeth means, and means to effect a particular setting of said stop means in response to each operation of the escapement releasing means.

18. The invention set forth in claim 17, said dog means being supported on a stationary portion of the machine, said escapement releasing means comprising a manual control on said carriage and means communicative between said manual control and said dog means in any position of the carriage.

19. In a machine for rendering characters on a record medium seriatim in accord with individually assigned space values; a selectively operable character rendering means, a letter-feeding carriage, an escapement mechanism for control of said carriage comprising row-of-teeth means, two escapement dog means to pay out variable space values to said row-of-teeth means and thus to said carriage, means to alternate said dog means as to engagement with said row-of-teeth means in response to each selective operation of said character rendering means, a variably settable stop means associated with said dog means to predetermine different space values to be paid out by the particular dog means which is newly brought into engagement with the row-of-teeth means, and means to variably set said stop means by selective operations of said character rendering means, a device operable to back space the carriage, means operated by said back spacing device incident to imparting back spacing movement to the carriage to disengage from said row-of-teeth means either of said dog means which happens to stand engaged, means operated by said back spacing device each time it imparts a back spacing movement to the carriage to effect a specific setting of said stop means, and means controlled by said back spacing device to cause automatically an engagement of only one of said dog means at the conclusion of the back spacing movement imparted to the carriage.

20. In a machine for rendering characters on a record medium seriatim in accord with individually assigned space values; a selectively operable character rendering means, a letter-feeding carriage, an escapement mechanism for control of said carriage comprising row-of-teeth means, two escapement dog means to pay out variable space values to said row-of-teeth means and thus to said carriage, means to alternate said dog means as to engagement with said row-of-teeth means in response to each selective operations of said character rendering means, a variably settable stop means associated with said dog means to determine different space values to be paid out by the particular dog means which is newly brought into engagement with the row-of-teeth means, and means to variably set said stop means by selective operations of said character rendering means, and a power back spacing device for the carriage comprising a back spacing element, a cyclically operable power means to operate said back spacing element, a control to call said cyclically operable power means into operation, and means controlled by the cyclically operable power means to effect during the operation of said back spacing element a disengagement of either of said dog means which may stand engaged, further to effect during such operation also a particular setting of said stop means, and further to cause at the conclusion of each back spacing movement imparted to the carriage an engagement of only one of said dog means, whereby at the end of each back spacing movement imparted to the carriage the newly engaged dog means, controlled by the said particular setting given to the stop means, will take control uniformly over the carriage.

21. The invention set forth in claim 20, said means which is controlled by said cyclically operable power means comprising cam means for timing the operations controlled thereby.

22. In a machine for rendering characters on a record medium seriatim in accord with individually assigned space values; a selectively operable character rendering means, a letter-feeding carriage, an escapement mechanism for control of said carriage comprising row-of-teeth means, two escapement dog means to pay out different space values to said row-of-teeth means and thus to said carriage, means to alternate said dog means as to engagement with said row-of-teeth means in response to each selective operation of said character rendering means, variably settable stop means associated with said dog means to predetermine different space values to be paid out by the particular dog means which is newly brought into engagement with the row-of-teeth means, and means to variably set said stop means by selective operations of said character rendering means, means to effect power movements of the carriage to desired positions comprising control means to institute such power movements and means automatically operative to terminate the power movements under the control of the carriage, means responsive to said control means to render both said dog means disengaged independently of the alternating means for said dog means, means responsive to said control means to effect a specific setting of said stop means before the power carriage movement is completed, and means to cause the engagement of only one dog means in response to the functioning of the automatically operative means.

23. In a machine for rendering characters on a record medium seriatim in accord with individually assigned space values; a frame, a selectively operable character rendering means, a letter-feeding carriage mounted to travel on said frame, means urging the carriage impositively in a letter-feeding direction, an escapement mechanism for control of said carriage comprising row-of-teeth means, two escapement dog means to pay out different space values to said row-of-teeth means and thus to said carriage, means to alternate said dog means as to engagement with said row-of-teeth means in response to each selective operation of said character rendering means, a variably settable stop means associated with said dog means to predetermine different space values to be paid out by the particular dog means which is newly brought into engagement with the row-of-teeth means, and means to variably set said stop means by selective operations of said character rendering means, a tabulating stop defining a tabulating position of the carriage, a counterstop projectable into tabulation terminating range of said tabulating stop and biased to restore, said tabulating stop and said counterstop provided oppositely on said frame and the carriage, a tabulation instituting means, means responsive to the instituting means (1) to project said counterstop, (2) to render the engaged dog means disengaged and (3) to effect a specific setting of said stop means, means to detain said counterstop automatically upon its projection, means to release said detaining means automatically by the relative encounter of said tabulating stop with the counterstop in a tabulating run of the carriage, means to delay the restoration of the projected counterstop following the release of said detaining means, and means to cause the automatic engagement of one of said dog means only incident to the delayed restoration of said counterstop.

24. The invention set forth in claim 23, said delay means comprising a constantly driven rotor, a one-way clutch means associated with said rotor and adapted to clutch itself automatically thereto for slow movement under its control if it is urged to rotate faster than such rotor and in the same direction, but adapted to disconnect itself operatively from said rotor automatically if it is either held or moved counter to the direction of rotation of the rotor, and connecting means between said counterstop and said one-way clutch means adapted to hold or move said clutch means counter to the direction of rotation of said rotor at all times except while the counterstop is restoring, and adapted momentarily upon the initial restoring movement of said counterstop following the release of said detaining means to move the clutch means in the direction of rotation of the rotor at a speed in excess of it, whereby said clutch means becomes clutched thereto and whereby the restoration of the counterstop is effected at controlled speed giving the carriage time to become settled before one of said dog means becomes automatically engaged incident to the restoration of said counterstop.

25. In a machine for rendering selectively characters on a record medium seriatim, a frame, a letter-feeding carriage mounted to travel on said frame, means urging the carriage impositively in a letter-feeding direction, an escapement mechanism to feed said carriage in response to each selective operation of said character rendering means, a tabulating stop defining a tabulating position of the carriage, a counterstop projectable into tabulation terminating range of said tabulating stop and biased to restore, said tabulating stop and counterstop being oppositely on said frame and carriage, a tabulation instituting means, means responsive to said instituting means to project said counterstop and to release said escapement mechanism, means to detain said counterstop automatically upon its projection, means to release said detaining means automatically by the relative encounter of said tabulating stop with said counterstop in a tabulating run of the carriage, means to delay the restoration of the projected counterstop following the release of said detaining means, and means to cause the reengagement of said escapement mechanism as the delayed restoration of said counterstop is taking place, said delay means comprising a constantly driven rotor, a one-way clutch means associated with said rotor and adapted to clutch itself automatically thereto for slow movement under its control if it is urged to rotate faster than such rotor and in the same direction, but adapted to disconnect itself operatively from said rotor automatically if it is either held or moved counter to the direction of rotation of the rotor, and connecting means between said counterstop and said one-way clutch means adapted to hold or move said clutch means counter to the direction of rotation of said rotor at all times except while the counterstop is restoring, and adapted momentarily upon the initial restoring movement of said counterstop following the release of said detaining means to move the clutch means in the direction of rotation of the rotor at a speed in excess of it, whereby said clutch means becomes clutched thereto and whereby the restoration of the counterstop is effected at controlled speed giving the carriage time to become settled before incident to the restoration of said counterstop said escapement mechanism becomes automatically reengaged.

26. In a typewriting machine having a carriage and a typing mechanism, the combination with elements which transversely of the machine are arranged alongside of each other and are selectively operable to cause character-selective operations of said typing mechanism, of an escapement mechanism to pay out to the carriage movements of measured extents comprising row-of-teeth means, two escapement dog means alternately engageable with said row-of-teeth means in corresponding initial space measuring positions and when engaged having movement-measuring control over said carriage, means operable to effect an alternation in the engagement of said two dog means with said row-of-teeth means in response to each operation of said typing mechanism, a series of selectable stop faces common to both said dog means and each when selected having motion limiting control over whichever of said dog means happens to become newly engaged with said row-of-teeth means, and means to select said stop faces individually under control of said elements, comprising a plurality of members severally universal to some of said elements for operation thereby and all such members when operated selecting one particular one of said stop faces, and another plurality of members severally universal to some of said elements for operation thereby and all such members when operated selecting another particular one of said stop faces, the members of each of said pluralities being neighboring laterally of the machine and being generally coextensive with lateral groups of adjacent elements which consist generally of no more than half the number of said elements, each of said members being universal to and operable by only certain of said elements of the groups which are coextensive therewith laterally of the machine.

27. In a typewriting machine having a carriage, a typing mechanism, and a proportional spacing mechanism for the carriage which includes a device adapted to give it various space controlling states, the combination with elements which transversely of the machine are arranged alongside of each other and are selectively operable to cause character-selective operations of said typing mechanism, of means to control said device incidental to each typing operation comprising a plurality of members severally universal to some of said elements for operation thereby and all such members when operated conditioning said device to one particular one of said states, and another plurality of members severally universal to some of said elements for operation thereby and all such members when operated conditioning said devices to another particular one of said states, the members of each of said pluralities being laterally of the machine generally coextensive with lateral groups of adjacent elements which consist generally of no more than half the number of said elements, whereby lightness of construction of said members and thereby lightness of operating resistance to the typing mechanism is facilitated, each of said members being universal to and operable by only certain of said elements of the groups which are coextensive therewith laterally of the machine.

28. The invention set forth in claim 27, said members being in the form of pivoted bails having variously teeth thereon at appropriate locations to render the different bails operable by certain of said elements.

29. The invention set forth in claim 27, the machine including a case shift mechanism, said members having two sets of teeth through the medium of the teeth of each of which sets the said elements are adapted respectively in the different case positions of the case shift mechanism severally to coact with particular ones of said members, and means controlled by the case shift mechanism to bring one or the other of said sets of teeth into potential use.

30. In a typewriting machine having a carriage, a typing mechanism, and a proportional spacing mechanism for the carriage which includes a device adapted to give it various space controlling states, the combination with elements which transversely of the machine are arranged alongside of each other and are selectively operable to cause character-selective operations of said typing mechanism, of means to control said device incidental to each typing operation comprising a plurality of members severally universal to some of said elements for operation thereby and all such members when operated conditioning said device to one particular one of said states, another plurality of members severally universal to some of said elements for operation thereby and all such members when operated conditioning said device to another particular one of said states, the members of each of said pluralities being laterally of the machine generally coextensive with lateral groups of adjacent elements which consist generally of no more than half the number of said elements, whereby lightness of construction of said members and thereby lightness of operating resistance to the typing mechanism is facilitated, links operable by said elements to operate said members, said links being generally parallel and having severally operating faces for action on said members, a case shift mechanism, said members having two sets of teeth through the medium of the teeth of each of which sets the said faces are adapted respectively in the different case positions of the case shift mechanism severally to coact with particular ones of said members, a structure extending transversely of the machine to guide the links near the said operating faces, and means controlled by the case shift mechanism to shift said members relatively to said structure transversely of the machine to bring one or the other of said sets of teeth into potential use.

31. In a typewriting machine having a carriage, a typing mechanism, the combination with elements which are selectively operable to cause character-selective operations of said typing mechanism, of an escapement mechanism to pay out to the carriage varied movements of measured extents, comprising row-of-teeth means, two escapement dog means alternately engageable with said row-of-teeth means in corresponding initial space measuring positions and when engaged having movement-measuring control over said carriage, means to effect a single alternation in the engagement of said two dog means with said row-of-teeth means in response to each operation of said typing mechanism, a series of individually projectable stops common to both said dog means and each when projected having motion limiting control over either of such two dog means which happens to be brought next into engagement with said row-of-teeth means, and means to render said stops individually selected by operations of said elements, comprising members operable selectively by said elements transitorily at each character-selective operation of said typing mechanism, and means to detain each stop as it is newly projected and to cause the restoration of any stop which has stood projected resultant to a previous operation of said typing mechanism.

32. In a typewriting machine having a carriage, a typing mechanism, the combination with elements which are selectively operable to cause character-selective operations of said typing mechanism, of an escapement wheel to pay out to the carriage varied movements of measured extents and having two rings of teeth, an escapement dog related to each one of said rings of teeth for space-measuring turning movement with said wheel, each dog adapted for engagement with and disengagement from its related ring of teeth, means to effect a single alternation in the engagement of said two dogs in response to each operation of said typing mechanism, a series of stops common to both said dogs arranged exteriorly of said wheel in individually radiating relations thereto for projection toward it to exercise motion limiting control over that one of the two dogs which happens to be brought next into engagement with its related ring of teeth, resilient retracting means for said stops, members operable selectively by said elements transitorily at each character-selective operation of said typing mechanism to project individual ones of said stops, and a universal member in control over said stops to detain each stop as it is newly projected and incident to any stop being newly projected being momentarily moved to cause the release of any stop which has stood detained resultant to a previous operation of said typing mechanism.

33. In a typewriting machine having a carriage urged impositively to advance and a typing mechanism, the combination with elements which are selectively operable to cause character-selective operation of said typing mechanism, of an escapement wheel having two rings of teeth, an escapement dog related to each one of said rings of teeth for space-measuring turning movement with said wheel, each dog adapted for engagement with and disengagement from its related ring of teeth, means operable to effect a single alternation in the engagement of said two dogs in response to each operation of said typing mechanism, a series of stops common to both said dogs, spaced exteriorly of said wheel circumferentially thereto and adapted for projection individually toward it to exercise carriage advancement control over whichever of the two dogs happens to be brought next into engagement with its related ring of teeth, individual setting elements for said stops, lost motion connections between said setting elements and their individually related stops, resilient means urging said setting elements to restore, members operable selectively by said first elements transitorily at each character-selective operation of said typing mechanism to operate said setting elements selectively and thereby to project individual ones of said stops, a universal means to detain each of said setting elements as it becomes newly operated to project its related stop, and means to release said universal means momentarily during typing operations before each completed operation of a setting element.

34. The invention set forth in claim 2, said alternation effecting means including provision so that in each operation of said operable means the disengaged dog means is first engaged and then the engaged dog means is disengaged.

35. In a machine for rendering selectively characters on a record medium seriatim, a frame, a letter-feeding carriage mounted to travel on said frame, means urging the carriage impositively in a letter-feeding direction, an escapement mechanism to feed said carriage in response to each selective operation of said character rendering means, a tabulating stop defining a tabulating position of the carriage, a counterstop projectable into tabulation terminating range of said tabulating stop and biased to restore, said tabulating stop and counterstop being oppositely on said frame and carriage, a tabulation instituting means, means responsive to said instituting means to project said counterstop and to release said escapement mechanism, means to detain said counterstop automatically upon its projection, means to release said detaining means automatically by the relative encounter of said tabulating stop with said counterstop in a tabulating run of the carriage, means to delay the restoration of the projected counterstop following the release of said detaining means, and means to cause the reengagement of said escapement mechanism as the delayed restoration of said counterstop is taking place, said delay means comprising a rotor which is motor driven at a given speed, and means connected with said counterstop and adapted through restoring movement thereof to move directionally in agreement with said rotor and to become restrained thereby to move at said given rotor speed, the speed of said rotor being such as to permit the carriage to become settled at the end of each tabulation before the counterstop restores free of the tabulating stop, and before said escapement mechanism becomes automatically reengaged.

36. An escapement mechanism for paying out movements of selectable magnitude to a movable element, comprising wheel means having ring-of-teeth means, two escapement dog means alternately engageable with said ring-of-teeth means in corresponding initial space measuring positions and each, when engaged in said ring-of-teeth means, having movement measuring control over said element, operable means, means to effect an alternation in the engagement of the two dog means with said ring-of-teeth means in response to each operation of said operable means, a series of stop slides arranged exteriorly of said wheel means and supported individually projectable toward said wheel means in angularly spaced planes which radiate from the axis of the wheel means, each stop slide when projected being in movement limiting range of either of said dog means which may be engaged in said ring-of-teeth means, and means to project said stop slides individually and to detain each projected stop slide projected pending the projection of another stop slide.

37. An escapement mechanism for paying out selectable movements of measured extents to a movable element, comprising an escapement wheel, two escapement dogs spaced axially of said escapement wheel and adapted for alternate entraining engagement therewith for movement measuring control over said element, an operable means, means to effect an alternation in the engagement of said two dogs with said escapement wheel in response to each operation of said operable means, and a variable stop means common to both said dogs and adapted to have motion-limiting control over whichever of said dogs becomes newly entrained with said escapement wheel, whereby varied movements of measured extent are adapted to be paid out by said escapement mechanism to said movable element, said operable means comprising a ratchet wheel advanced a single tooth space at each operation thereof, and a toothed wheel connected to said ratchet wheel and adapted to make a half tooth advance for every single tooth advance given to said ratchet wheel and being instrumental incident to each half tooth advance thereof to effect an alternation in the engagement of said dogs, said toother wheel having its axis substantially in the plane of the escapement wheel and being disposed exteriorly of said escapement wheel.

References Cited in the file of this patent

UNITED STATES PATENTS

| | | |
|---|---|---|
| 851,504 | Drewell | Apr. 23, 1907 |
| 2,351,837 | Prezioso | June 20, 1944 |